United States Patent
Campbell

(10) Patent No.: US 10,837,711 B2
(45) Date of Patent: Nov. 17, 2020

(54) HEAT TRANSFER DEVICE

(71) Applicant: WILLIAMS ADVANCED ENGINEERING LIMITED, Oxfordshire (GB)

(72) Inventor: Douglas Campbell, Wantage Oxfordshire (GB)

(73) Assignee: WILLIAMS ADVANCED ENGINEERING LIMITED, Oxfordshire (GB)

( * ) Notice: Subject to any disclaimer, the term of this patent is extended or adjusted under 35 U.S.C. 154(b) by 0 days.

(21) Appl. No.: 14/770,253

(22) PCT Filed: Feb. 25, 2014

(86) PCT No.: PCT/GB2014/050556
§ 371 (c)(1),
(2) Date: Aug. 25, 2015

(87) PCT Pub. No.: WO2014/132047
PCT Pub. Date: Sep. 4, 2014

(65) Prior Publication Data
US 2016/0003553 A1 Jan. 7, 2016

(30) Foreign Application Priority Data
Feb. 26, 2013 (GB) .................................. 1303386.5

(51) Int. Cl.
*F28D 9/00* (2006.01)
*F28F 9/26* (2006.01)
(Continued)

(52) U.S. Cl.
CPC ......... *F28D 9/0093* (2013.01); *F28D 1/0333* (2013.01); *F28D 1/05358* (2013.01);
(Continued)

(58) Field of Classification Search
CPC ............. H01M 10/613; H01M 10/615; H01M 10/625; H01M 10/647; H01M 10/6557;
(Continued)

(56) References Cited

U.S. PATENT DOCUMENTS 5,419,981 A * 5/1995 Golben ............... H01M 10/345
429/101
2002/0195237 A1 12/2002 Luz et al.
(Continued)

FOREIGN PATENT DOCUMENTS

EP 2584644 4/2013
GB 714824 9/1954
(Continued)

OTHER PUBLICATIONS

Machine Translation of the description of WO 2013/037742 A1 from Espacenet.com website. (Year: 2013).*

*Primary Examiner* — Gregg Cantelmo
(74) *Attorney, Agent, or Firm* — Lando & Anastasi, LLP

(57) ABSTRACT

A heat transfer device including a body bounding a cavity for receiving a heat transfer medium, an inlet, and an outlet for providing a fluid connection to the cavity is provided. Interconnecting elements are provided at each of the inlet and outlet for providing a fluid connection to the inlet and the outlet. At least one interconnecting element is configured to interconnect with, and provide relative movement between and a substantially consistent fluid connection with, an interconnecting element of an adjacent device, such as a similar heat transfer device, over a range of spacing between bodies of the devices.

12 Claims, 4 Drawing Sheets

(51) Int. Cl.

|   |   |
|---|---|
| *H01M 10/6557* | (2014.01) |
| *H01M 2/10* | (2006.01) |
| *F28D 1/053* | (2006.01) |
| *H01M 10/647* | (2014.01) |
| *H01M 10/625* | (2014.01) |
| *F28D 15/00* | (2006.01) |
| *H01M 10/615* | (2014.01) |
| *H01M 10/613* | (2014.01) |
| *F28D 1/03* | (2006.01) |
| *F28F 3/04* | (2006.01) |
| *F28D 21/00* | (2006.01) |

(52) U.S. Cl.
CPC .............. *F28D 15/00* (2013.01); *F28F 3/046* (2013.01); *F28F 9/264* (2013.01); *H01M 2/1077* (2013.01); *H01M 10/613* (2015.04); *H01M 10/615* (2015.04); *H01M 10/625* (2015.04); *H01M 10/647* (2015.04); *H01M 10/6557* (2015.04); *F28D 2021/0029* (2013.01); *F28F 2275/205* (2013.01); *H01M 2220/20* (2013.01)

(58) Field of Classification Search
CPC ............ H01M 2/1077; H01M 2220/20; F28D 1/0333; F28D 1/05358; F28D 9/0093; F28D 15/00; F28D 2021/0029; F28F 3/046; F28F 9/264; F28F 2275/205
See application file for complete search history.

(56) References Cited

U.S. PATENT DOCUMENTS

| | | | |
|---|---|---|---|
| 2003/0017387 A1* | 1/2003 | Marukawa | H01M 2/1077 429/156 |
| 2009/0258288 A1* | 10/2009 | Weber | H01M 2/10 429/120 |
| 2011/0293985 A1* | 12/2011 | Champion | H01M 10/0413 429/120 |
| 2012/0251865 A1 | 10/2012 | Heckenberger et al. | |
| 2013/0108902 A1* | 5/2013 | Kristofek | H01M 2/1077 429/72 |
| 2013/0143093 A1* | 6/2013 | Teng | F28F 3/12 429/120 |

FOREIGN PATENT DOCUMENTS

| | | | | |
|---|---|---|---|---|
| JP | 2009238606 A | * | 10/2009 | |
| WO | WO 2012/120092 | | 9/2012 | |
| WO | WO 2013/037742 | | 3/2013 | |
| WO | WO 2013037742 A1 | * | 3/2013 | .......... H01M 2/1061 |

* cited by examiner

HEAT TRANSFER DEVICE

The present invention relates to a heat transfer device, in particular, but not exclusively a heat transfer device for a battery. The invention also relates to a battery module comprising a battery cell and a heat transfer device and a heat transfer assembly comprising an array of heat transfer devices. The invention also relates to a battery stack and a vehicle such as a motor land vehicle comprising such devices.

It is known to provide battery packs in various applications, such as automotive and aerospace. In order to provide to provide sufficient voltage and power, a plurality of battery packs are connected in series and/or parallel or mixture of both. Because of packaging limitations, for example, when such battery packs are employed in vehicles or aircraft for example, battery packs are often provided in a stack comprising an array of battery packs. During charging and discharging of the battery packs, heat can be generated. In order to prevent overheating and maintain optimum performance of the battery packs, cooling systems can be employed. These can include heat exchangers utilising a heat transfer medium. However, even with such cooling systems, it is often necessary to operate the battery packs, for example, battery packs comprising lithium based battery cells, within a certain temperature range. The heating and cooling of the battery packs can lead to expansion and contraction of the battery packs, which can lead to packaging problems when the battery packs are assembled in a stacked array.

The present invention aims to alleviate at least to a certain extent at least one of the problems of the prior art.

According to a first aspect of the present invention, there is provided a heat transfer device comprising: a body bounding a cavity for receiving a heat transfer medium; an inlet and an outlet for providing a fluid connection to said cavity; interconnecting means provided at each of the inlet and outlet for providing a fluid connection to said inlet and outlet, at least one of the interconnecting means, such as both when there are two, being configured to interconnect with and provide relative movement between and a substantially consistent fluid connection with an interconnection means of an adjacent device such as a similar heat transfer device over a range of spacing between bodies of said adjacent devices. consistent fluid connection, i.e. the fluid connection is generally unchanged in integrity during relative movement between adjacent heat transfer devices.

The body of the heat transfer device is preferably substantially resistant to deformation. Internal ribs or struts may provide a substantially rigid construction.

Preferably, the interconnecting means provides a relative sliding interconnection with a similar interconnecting means of a similar heat transfer device. Advantageously, such a connection allows for relative movement without strain between interconnected connecting means.

Preferably, the interconnecting means comprises a first connecting portion and a second portion of complimentary form. This allows an interconnecting means of one design to be used and enable a plurality of heat transfer devices to be connected. The complimentary form may be of any type, for example complimentary tubular forms which can overlay or overlap with one another.

Preferably, the interconnecting means are provided in the form of spigots.

Preferably, the first connecting portion comprises a first tubular portion and the second connecting portion comprises a second tubular portion and wherein an inner surface of the first tubular portion is sized to substantially match the outer diameter of the second tubular portion.

Preferably, the interconnecting means comprises a sealing means to provide a fluid-tight seal with a similar interconnecting means. The sealing means may comprise an o-ring. The o-ring may be formed of a nitrile or a rubber material. The sealing means may be located in a receiving groove on an internal or external joining surface of the interconnecting means. Preferably, the sealing means are slidable against or relative to an adjoining component.

Preferably, the interconnecting means comprises a through fluid passage extending therethrough and a further fluid passage providing a fluid passage from the through passage to the cavity of the heat transfer device. Advantageously, by providing a through fluid passage, when a plurality of interconnection means are connected in series, a common fluid channel is formed, which may act as a manifold. The further fluid passages from each interconnecting means provide a fluid passage from the common fluid channel to each of the cavities of the heat transfer devices.

Preferably, the interconnecting means at both the inlet and the outlet are orientated parallel to one another. The interconnecting means may comprise inlet and outlet apertures. The inlet and outlet apertures may comprise generally straight tubes, the tubes optionally extending parallel to one another. Providing the interconnecting means at both the inlet and outlet in parallel alignment enables a plurality of heat transfer devices to be connected to one another.

Preferably, the interconnecting means are arranged perpendicular to a surface plane of the body. Advantageously, this allows a plurality of heat transfer devices to be arranged parallel to one another, with their perimeter or periphery coextensive.

Preferably, the interconnecting means extend either side of the body. The interconnecting means may be formed with interconnecting parts in the form of a spigot. The interconnecting means may be formed with spigot-like interconnecting parts such that the interconnecting means may be connected to an interconnecting means of an adjacent heat transfer device.

Preferably, the device is configured such that two or more similar heat transfer devices may be arranged in stacked arrangement fluidly connected via the interconnection means.

Preferably, the heat transfer device comprises a plurality of fluid flow channels extending generally from said inlet to said outlet. The fluid flow channels may comprise a series of parallel channels or any other suitable arrangement of channels. The channels may be configured to optimise the flow of cooling or other heat transfer medium, for example a liquid or gas through the cavity of the body of the heat transfer device from the inlet to the outlet.

Flow disturbers may also be positioned within the cavity of the heat transfer device. These may take the form of circular protrusions.

Preferably, the body is formed of a pair of opposing half shells. The half shells may be formed of a thin sheet material. The material may be a metal material, for example aluminium or an alloy thereof. Other alloys or materials with high heat transfer properties may be chosen depending on the structural and heat transfer requirements.

Preferably, the body has a substantially rectangular form comprising two relatively longer edges and two relative shorter edges. An interconnecting means may be provided on each of the relative shorter sides.

Preferably, the half shells are pressed or formed to produce their shape and any channels and/or flow disturbers therein.

Preferably, the half shells are directly and sealingly joined to one another to form said body. Advantageously, no intermediate layer is required, for example a gasket. The half shells may be joined by brazing or any other suitable technique.

The interconnection means are preferably formed of a similar material to that of the body of the heat transfer device. The interconnection means may be sealingly joined by brazing to the body of the heat transfer device. Alternatively, the interconnection means may be formed integrally with the body.

Preferably, the body comprises two generally planar parallel outer surfaces. The surfaces may preferably provide a heat transfer surface which can be positioned in use against a device to be subject to heat transfer e.g. cooled, for example a battery cell.

According to a second aspect of the present invention, there is provided a battery module comprising a battery cell and a heat transfer device according to the first aspect of the invention. In use, when a heat transfer medium is passed through the cavity of the heat transfer device, the temperature of the battery cell can be controlled. The battery module may include a plurality of adjacent said battery cells and heat transfer devices arranged in a stack.

According to a third aspect of the invention, there is provided a heat transfer assembly comprising a plurality of heat transfer devices, each heat transfer device comprising a body bounding a cavity of substantially constant volume for receiving a heat transfer fluid or medium, wherein a gap or spacing is provided between opposing heat transfer surfaces of adjacent heat transfer devices, each heat transfer device being fluidly connected via an interconnection means with an adjacent heat transfer device, wherein the interconnection means is configured to maintain a consistent fluid connection and permit variation in the spacing between opposing surfaces of adjacent heat transfer devices.

A battery cell or pack may be accommodated in the spacing between opposing heat transfer surfaces of adjacent heat transfer devices. The heat transfer devices may be configured to maintain a substantially constant volume to ensure that a consistent volume of heat transfer medium may be maintained and thus the heat transfer performance of the heat transfer device. During use, if there should be expansion or contraction of the battery cells or packs e.g. due to changes in temperature as a result of charging or discharging, the interconnecting means permit variation in the spacing between adjacent heat transfer devices but maintain a consistent fluid connection.

Preferably, the interconnection means between adjacent heat transfer devices provide a common and continuous fluid connection. Two or more such common fluid connections may be provided. One common fluid connection may serve as a common inlet or inlet manifold to all the heat transfer devices and another as a common outlet or outlet manifold to the all the heat transfer devices.

The flow of heat transfer e.g. cooling medium may be in parallel in each heat transfer device.

The common inlet and outlet may be connected to a fluid circuit which may include heat rejection means such as a radiator or heat provision means such as a heater, or both.

Preferably, the plurality of heat transfer devices are in parallel coextensive alignment. This provides for a compact arrangement.

Preferably, securing means are provided to limit displacement of the heat transfer devices. The securing means may comprise end plates arranged at each end of the heat transfer assembly. The spacing between the end plates may be fixed. This ensures that the overall external dimensions of the heat transfer assembly are constant.

The end plates may be planar sheets which are coextensive with the heat transfer surfaces of the heat transfer devices.

Preferably, biasing means are provided for example to provide a generally or substantially even pressure on the heat transfer devices. The biasing means may be provided in the form of springs, for example coil springs, between the end plates and the outermost heat transfer devices in the assembly.

An alignment or keep plate may be provided between the biasing means and each of the outermost heat transfer devices. This alignment sheet may serve to prevent localised pressure on the heat transfer device by the biasing means.

Preferably, alignment means are provided for maintaining the heat transfer devices in parallel alignment.

Preferably, the alignment means comprise one or more securing rods or bolts passing through apertures formed in each of the plurality of heat transfer devices.

Preferably, each of the heat transfer devices in the assembly is a heat transfer device according to the first aspect of the invention.

According to a fourth aspect of the invention, there is provided a battery stack, comprising a heat transfer assembly according to the third aspect of the invention, wherein a battery cell, pack or pouch or the like is located in the spacing between opposing heat transfer devices.

According to a fifth aspect of the invention, there is provided a vehicle, such as a motor land vehicle or aircraft, comprising a heat transfer device according to the first aspect of the invention, and/or a heat transfer assembly according to the third aspect of the invention and/or a battery module according to the second aspect of the invention and/or a battery stack according to the fourth aspect of the invention.

The present invention may be carried out in various ways and an example of a preferred embodiment will now be described by way of example with reference to the accompanying drawings in which.

Figure 1:
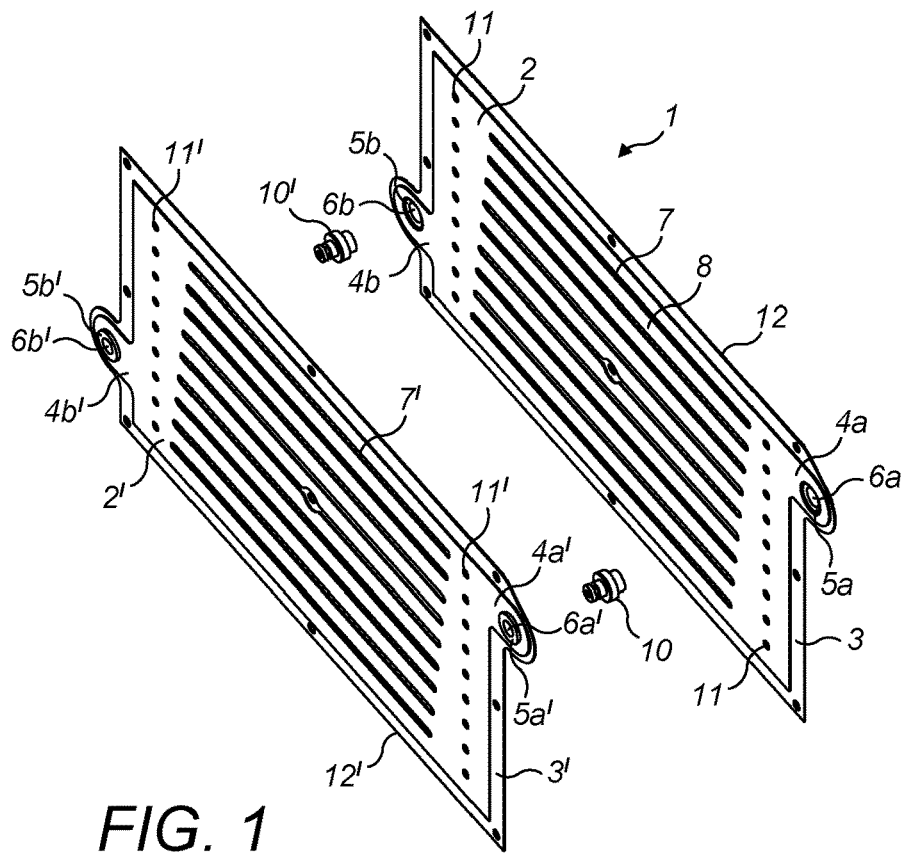
FIG. 1 shows an exploded perspective view of a heat transfer device.

FIG. 1 shows an exploded view of a heat transfer device shown generally at 1. The heat transfer device comprises a body formed of a first half-shell 12 and second half shell 12'. The first half shell 12 is formed as a substantially rectangular planar plate 2. The plate has two parallel longer edges and two parallel shorter edges. In the embodiment, the shorter edges are each in the order of 50% the length of the longer edges.

The half shells 12, 12' may be made of a sheet material such as aluminium or alloys thereof. However, any suitable material may be used. The half shells 12, 12' may be pressed or machined.

The rectangular plate 2 of the first half shell 12 includes a flange section 4a, 4b extending from each of the shorter sides of the plate 2 and generally coplanar therewith. The flange sections 4a, 4b have a generally semicircular profile.

The flange sections 4a, 4b are provided in or towards opposing diagonal corners of the rectangular plate 2. In each flange section 4a, 4b, a circular stepped recess 5a, 5b is formed. Concentric with the rotational axis of each of the circular stepped recess 5a, 5b, a circular through aperture 6a, 6b is provided in the flange section 4a, 4b.

Around the periphery of the first half shell, a planar sealing edge 3 is provided. The planar edge is arranged parallel and offset to the plane of the rectangular plate 2. The edge 3 is relatively narrow compared with the length of the shorter side of the planar plate. The edge 3 is generally of a consistent width around the periphery of the half shell 12.

Within the boundary of the rectangular plate 2 of the half-shell 12, a plurality of parallel ribs 7 are formed. These parallel ribs 7 may be pressed or formed in the rectangular plate 2 such that the surface of the planar plate 2 is formed with undulations.

These parallel ribs 7 are arranged spaced from one another to form channels 8 therebetween extending parallel to the longer sides of the rectangular plate 2 of the half shell 12. In the embodiment, the ribs 7 are equispaced such that the channels 8 are each of an equal width.

In the embodiment, the ends of the ribs 7 and hence the channels 8 are spaced increasingly away from the shorter side of the rectangular planar plate 2 in a direction away from the respective flange portion on each of the shorter sides of the plate 2.

A series of protrusions 11, in the embodiment circular protrusions (or flow disturbers or supporting means), are provided in linear alignment parallel and spaced from each of the shorter sides of the rectangular plate 2. Each circular protrusion 11 is in alignment with an adjacent rib 7. The diameter of each protrusion 11 is substantially equal to the width of the adjacent rib 7. The circular protrusions also serve to maintain a spacing between the inner surfaces of the body or plenum. This serves to reduce the likelihood of the heat transfer devices, being crushed or squashed, for example the outermost surfaces of outermost heat transfer devices arranged in an assembly or stack.

The opposing half-shell 12' is formed similar to (but as a reflection in a plane parallel to the extent of shell 12) the first half-shell, being formed of a substantially rectangular planar plate 2'. The plate 2' thus has two parallel longer edges and two parallel shorter edges. In the embodiment, the shorter edges are each in the order of 50% the length of the longer edges and are equal in length to those of the plate 2 of the first half shell 12.

As with the plate 2 of the first half shell 12, the plate 2' of the second half shell 12' includes a flange section 4a', 4b' extending from each of the shorter sides or edges of the plate 2' and generally coplanar therewith. The flange sections 4a', 4b' have a generally semicircular profile and match the form of the flange sections 4a, 4b of the first half shell 12.

The flange sections 4a', 4b' are provided in or towards opposing diagonal corners of the rectangular plate 2'. In each flange section 4a', 4b', a circular stepped recess 5a', 5b' is formed. Concentric with the rotational axis of each circular stepped recess 5a', 5b', a circular through aperture 6a', 6b' is provided. The axes of the apertures 6a', 6b' and circular stepped recesses 5a', 5b' of the second half shell 12' are arranged such that when the first and the second half shells 12, 12' are brought adjacent to one another, the apertures 6a, 6b, 6a', 6b of each half shell 12, 12' are in corresponding alignment.

Around the periphery of the second half shell 12', a planar sealing edge 3' is provided. The planar edge 3' is arranged parallel and offset to the plane of the rectangular plate 2'. The edge is relatively narrow compared with the length of the shorted side of the planar plate. The edge 3' is generally of a consistent width around the periphery of the half shell.

Within the boundary of the rectangular plate 2' of the second half-shell 12', a plurality of parallel ribs 7' are formed in substantially identical configuration to the ribs 7 of the first half shell 12. These parallel ribs 7' may be pressed or formed in the rectangular plate.

A series of protrusions 11' (or flow disturbers), in the embodiment circular protrusions are provided in linear alignment parallel and spaced from each of the shorter sides of the rectangular plate section 2. Each circular protrusion is in alignment with an adjacent rib. The diameter of each protrusion is substantially equal to the width of the adjacent rib.

The first and second half shells 12, 12' are substantially complimentary in form with the peripheral edge 3, the circular recesses 5a, 5b, ribs 7, and channels 8 of the first half shell being offset from the rectangular plate 2 in a direction opposite to those of the second half shell. In this way, the two half-shells 12, 12' may be brought together to form a body defining or bounding a cavity or volume between the two half-shells 12, 12' through which a heat transfer medium may pass, and with the respective ribs 7,7' and protrusions 11, 11' touching one another.

The two half shells 12, 12' may be formed of a heat conductive material, such as a metal. In the embodiment, an aluminium alloy is used. The two-half shells 12, 12' may be sealingly joined along their peripheral edges 3, 3' edges for example by brazing.

Between corresponding opposing circular apertures 5a, 5a', 5b, 5b' of opposing half shells 12, 12', an interconnecting means 10, 10' is provided sealingly brazed to both half shells 12, 12'. In the embodiment, the interconnecting means 10, 10' is provided in the form of a spigot. The spigot is arranged with tubular portions which are configured to locate in opposing circular apertures 5a, 5a', 5b, 5b'.

Figure 2:
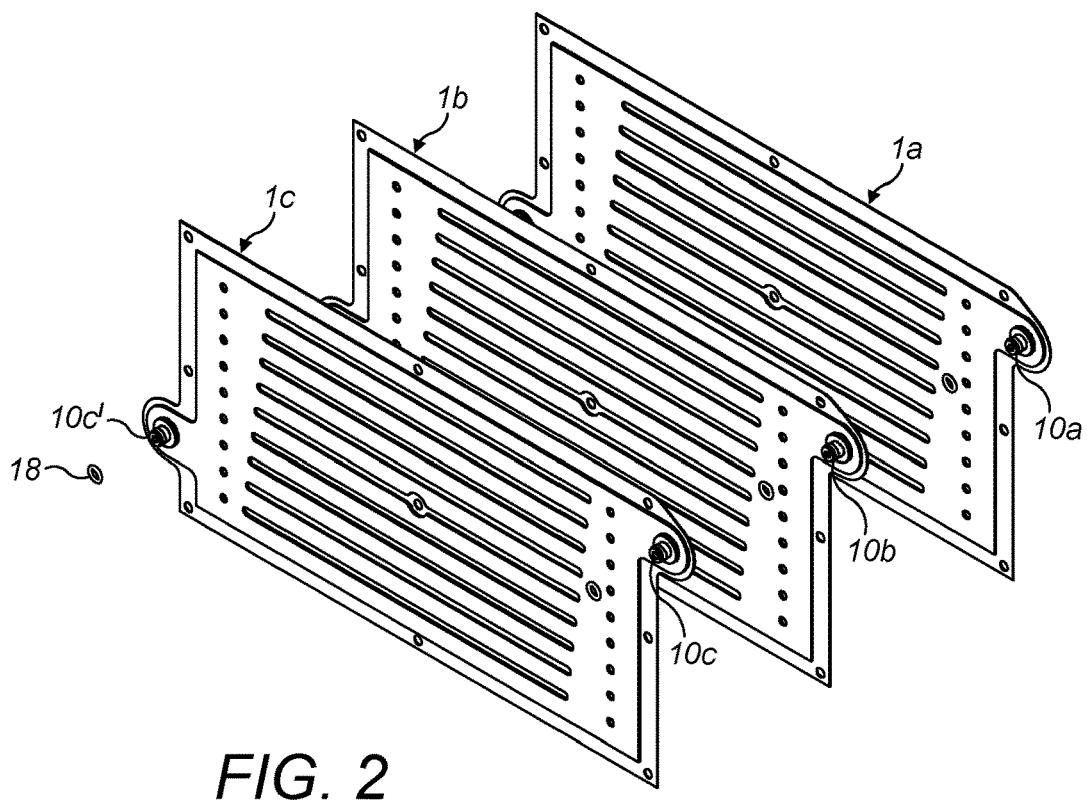
FIG. 2 shows three heat transfer devices in spaced alignment.

FIG. 2 shows a plurality of assembled heat transfer devices 1a, 1b, 1c as described in relation to FIG. 1 in spaced alignment. Each of the heat transfer devices is formed similarly such that the spigots 10a, 10b, 10c along each side are in alignment.

Figure 3:
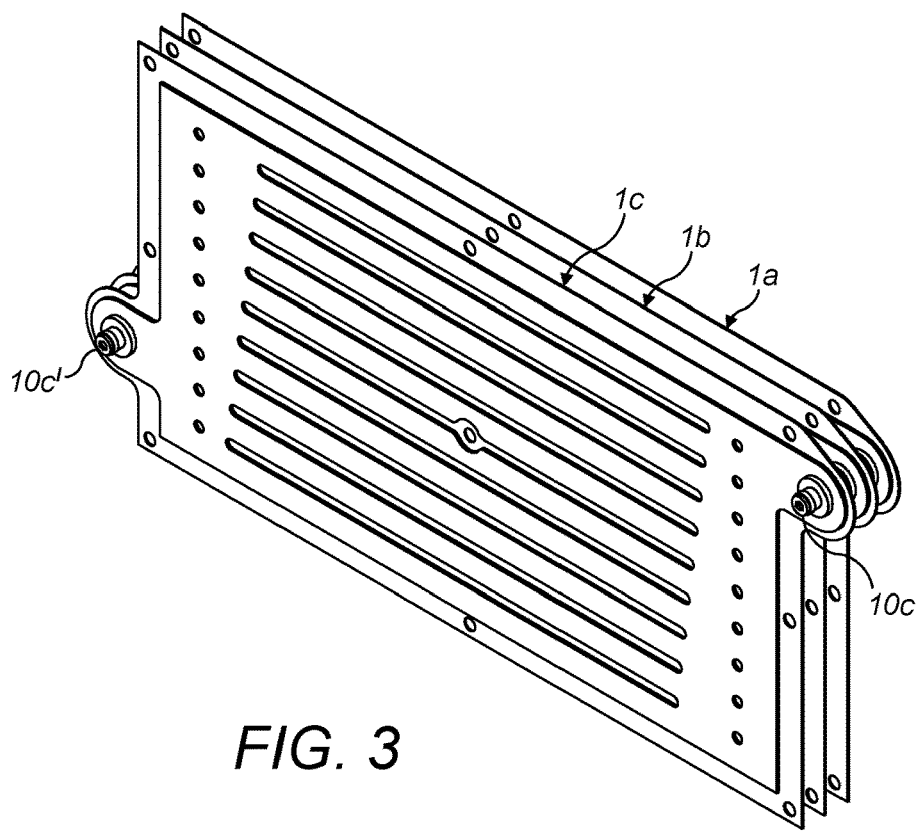
FIG. 3 shows three heat transfer devices in interconnected configuration.

FIG. 3 shows a plurality of heat transfer devices 1a, 1b, 1c in interconnected arrangement. Each of the spigots 10c is formed to interconnect with the spigot of an adjacent heat transfer device. Each spigot has a through channel such that when the spigots are interconnected to form a continuous through channel or manifold between spigots along each side of the interconnected heat transfer devices.

Figure 4:
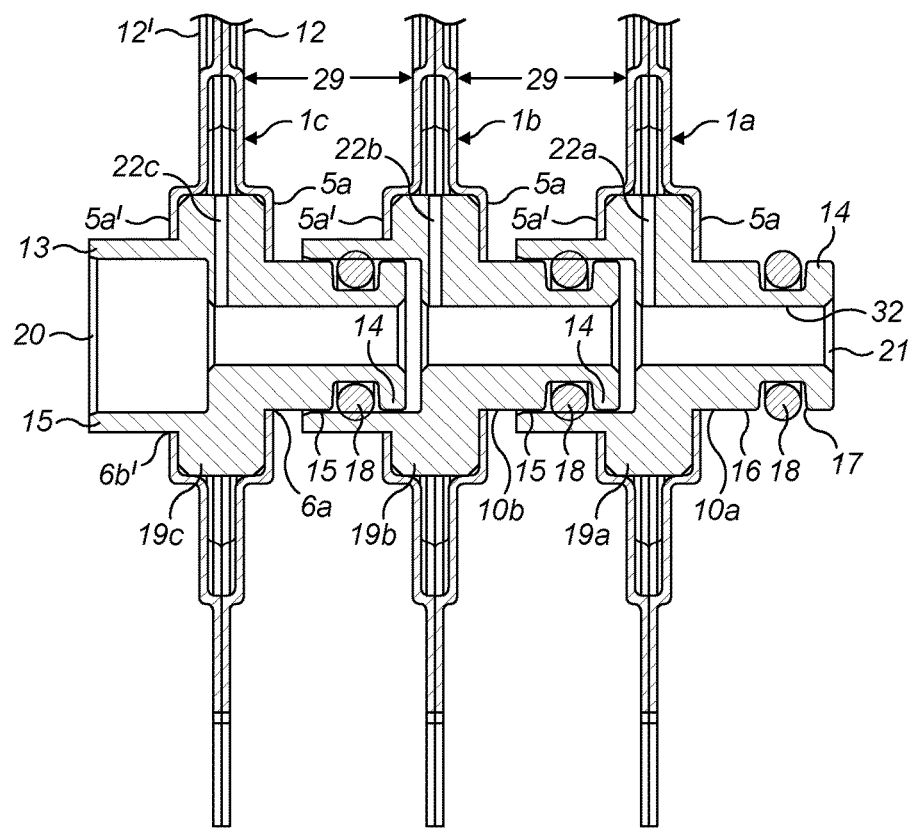
FIG. 4 shows a cross-sectional view through the interconnected heat transfer devices and the interconnecting means thereof shown in FIG. 3.

FIG. 4 shows a cross-sectional view through the spigots and heat transfer devices when interconnected.

Each spigot 10a, 10b, 10c comprises a first generally tubular portion or section 13 and a second generally tubular portion 14 concentric therewith. The first tubular 13 is sized with an internal bore 15 with a diameter to match the external diameter 16 of the second tubular portion 14. In this way, the second tubular portion 14 of one spigot 10a, 10b, 10c can be interconnected by insertion into the internal bore 15 of a first tubular portion 13 of an adjacent spigot. The first tubular portion 13 may be provided with a slight chamfer 20 between the inner circumferential surface 15 and the free end. A chamfer 21 is also provided between the inner circumferential surface 32 at the free end of the second tubular portion 14. The through channel extends along past surfaces 15, 32.

As can be seen in FIG. 4, at the junction of the first tubular portion 13 and the second tubular portion 14 of each spigot 10a, 10b, 10c a radially extending flange 19a, 19b, 19c is provided. The second relatively smaller tubular portion 14 of each spigot 10a, 10b, 10c is provided with a circumferential groove 17 towards its free end formed in its outer surface 16. The groove 17 has a generally rectangular cross section. As shown in FIG. 4, a sealing element in the form of an o-ring 18 may be located in the groove. The o-ring may be formed of a nitrile or rubber or other suitable material.

As can be seen in FIG. 4, the first relatively large tubular portion 13 of one spigot is located over the second relatively smaller tubular portion 14 of an adjacent spigot. The sealing element in the form of the O-ring 18 serves to provide a sliding seal between the internal circumferential surface 15 of the first tubular portion 13 and the outer circumferential surface 16 of the second tubular portion 14 located thereover.

The axial extent of the first tubular portion 13 is such that the first tubular portion 13 can overlap the second tubular portion 14 of an interconnecting spigot. This means that the first tubular portion 13 may slide or move relative to the second tubular portion 14 while maintaining a fluid-tight seal.

The circular recesses 5a, 5a' in each of the first and second half-shells 12, 12' of each heat transfer device form a radial recess in which the radially extending flange 19a, 19b, 19c of a spigot 10a, 10b, 10c may be located. The spigots are formed of a similar material to that of the half shells, for example an aluminium alloy and may be brazed to form a join with the half shells.

When interconnected, a continuous through channel is formed between adjacent spigots through the tubular portions of each spigot.

A radially extending channel 22a, 22b, 22c, in the embodiment with a circular cross-section, is provided between the axially extending axial through channel of each spigot. The channel, in the embodiment, extends radially through the radial flange 19a, 19b, 19c of a spigot. This channel provides a fluid connection from the axial through channel of the spigot to the cavity formed between opposing half-shells 12, 12' of a heat transfer device 1a, 1b, 1c. The channel 22a, 22b, 22c may extend horizontally (or along the longitudinal direction of the half shells 12, 12'). In other embodiments, the channel may be directed at a different angle or may have an arcuate or sector-like section. Each spigot may also or alternatively have a plurality of said channels aimed in different directions.

When the heat transfer devices 1a, 1b, 1c are interconnected, a fluid may be fed into the free end of an outermost spigot along a combined channel formed by interconnected spigots. The fluid may flow through the channels of each of the spigots into the volume of cavity of each heat transfer devices 1a, 1b, 1c. The fluid is a heat transfer medium. The spigots thereby serve as a manifold. While only three heat transfer devices are shown interconnected in FIG. 4, additional similar heat transfer devices may be connected as required by simply connecting spigots of adjacent heat transfer devices.

Between each heat transfer device, a spacing 29 or offset (FIG. 4) is provided. As adjacent spigots may move or slide relative to one another, the spacing 29 between adjacent heat transfer devices may be adjusted. The volume bound by the body formed of the two half shells 12, 12' of each heat transfer device remains however substantially constant.

Figure 5:
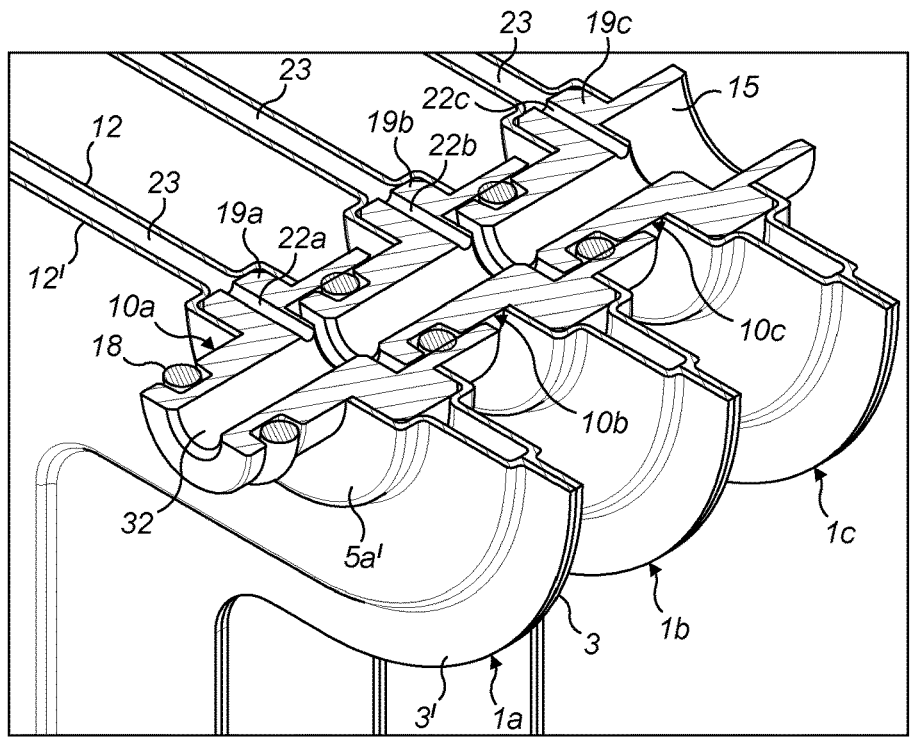
FIG. 5 shows a perspective view of the cross-sectional view shown in FIG. 4.

FIG. 5 shows a perspective cross-sectional view through three interconnected heat transfer devices 1a, 1b, 1c as shown in FIG. 4. Each spigot 10a, 10b, 10c provides a fluid connection via the channel 22a, 22b, 22c to the cavity or volume 23 bound by the half shells 12,12' of each heat transfer device 1a, 1b, 1c.

Figure 6:
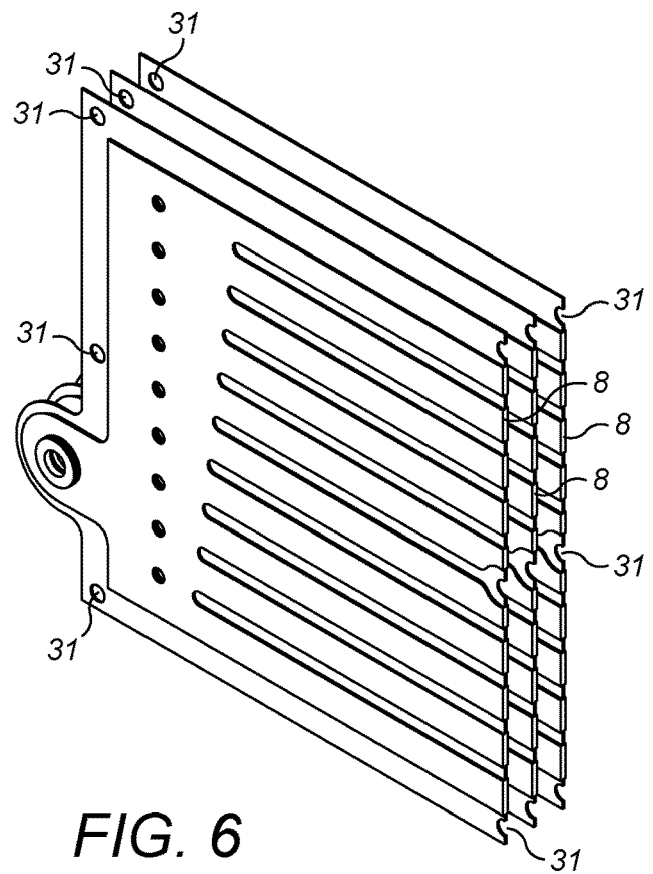
FIG. 6 shows a cross sectional view across the heat transfer medium channels within each of the heat transfer devices in interconnected arrangement.

FIG. 6 shows a cross-section through three interconnected heat transfer devices in a mid plane extending transverse to the outer surface planes of the heat transfer devices. As can be seen in FIG. 6, the ribs formed in each half shell of a heat transfer device are in touching engagement such that a plurality of flow channels 8 are formed extending parallel to the longitudinal edges of the respective heat transfer device.

Each heat transfer device is provided with a plurality of through holes 31 arranged spaced around the peripheral edge and also through the centre of the heat transfer device.

Figure 7:
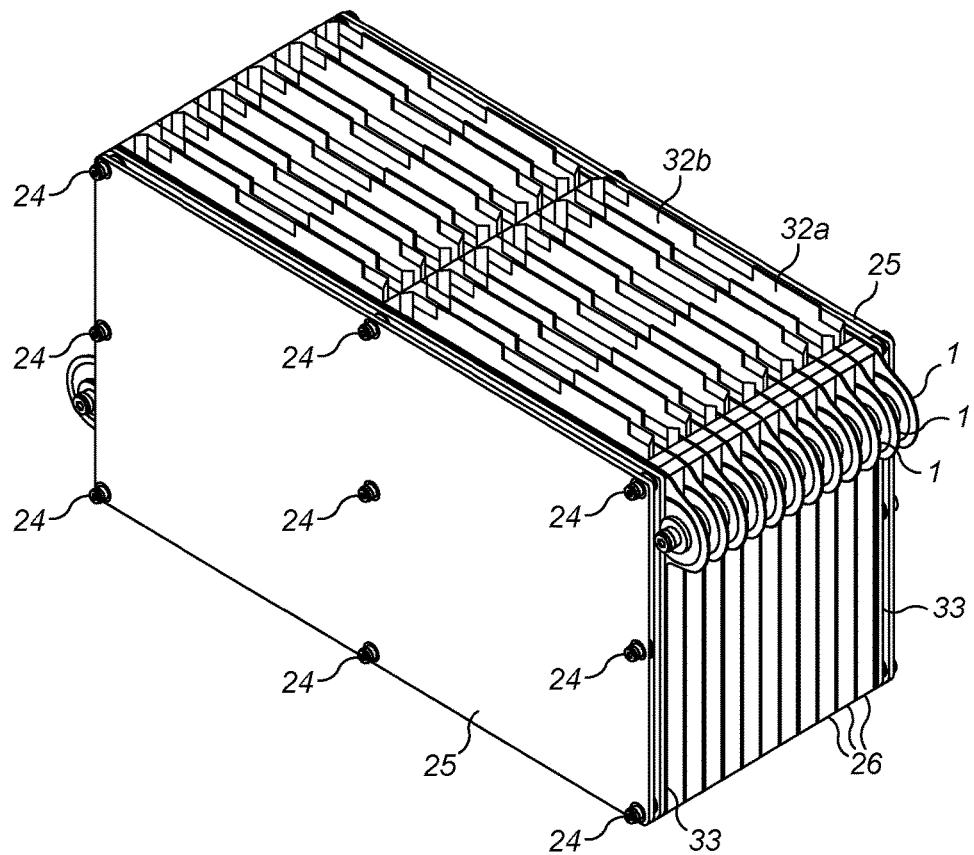
FIG. 7 shows a perspective view of an array of heat transfer devices and battery packs in a stacked arrangement.

FIG. 7 shows a plurality of identical heat transfer devices 1 as described above provided in parallel alignment to form a stack or array. The heat transfer devices 1 are aligned by locating bolts 24 which are fed through the apertures or holes 31 formed in the periphery 3,3' of each heat transfer device.

A battery pack, cell or pouch 26 is provided between adjacent heat transfer devices. Other items requiring temperature control may also be placed in between, such as electronic control or power electronics, charging circuits or the like associated with each bank of cells.

An alignment plate 33 is provided against the outermost face of the heat transfer devices at each end of the stack. A securing plate 25 is provided at each outermost end of the stack spaced from the alignment plate 33. Each securing plate 25 and alignment plate 33 is formed substantially as a rectangular planar plate sized to match the rectangular form of a heat transfer device.

Each battery pack or pouch 26 may be provided with connecting terminals 32a, 32b.

As can be seen in FIG. 7, the spigots along each of the shorter sides of heat transfer devices 1 are interconnected. In use a heat transfer medium may be fed along one of the rows of interconnected spigots such that the heat transfer medium flows through the internal volume of the heat transfer devices to the row of the interconnected spigots formed on the opposing shorter side of the stack. The flow of heat transfer medium is thus in parallel across the heat transfer devices in the stacked array.

Figure 8:
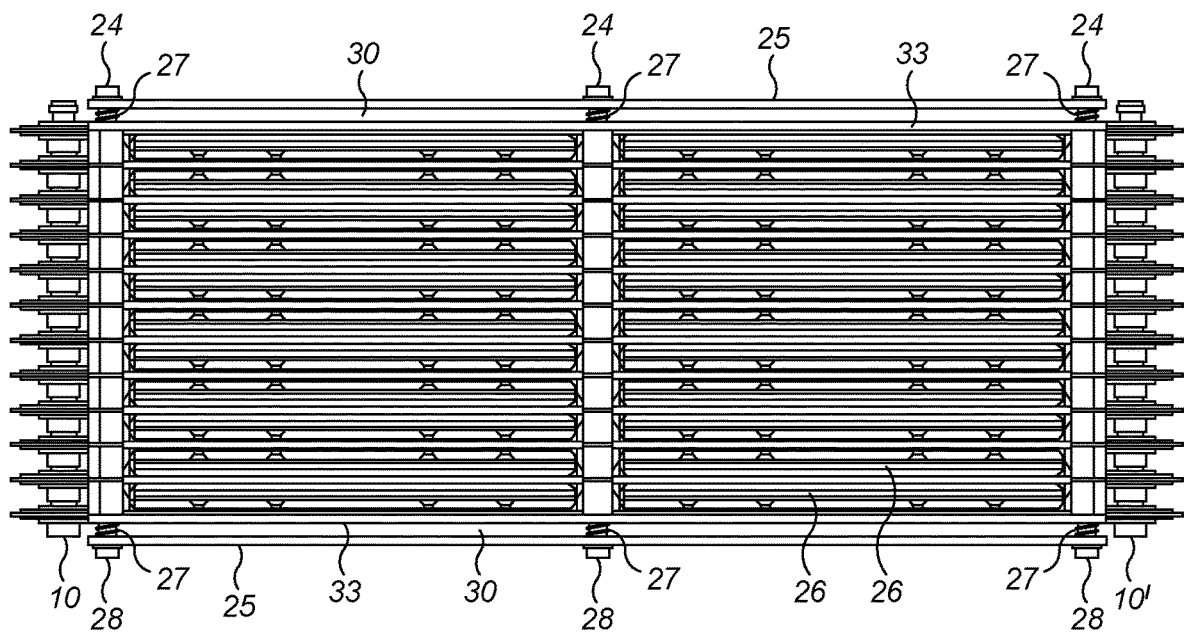
FIG. 8 shows a top view of the array of heat transfer devices shown in FIG. 7.

FIG. 8 shows a plan view of the stack of FIG. 7. Between the securing plates 25 provided at each end of the stack and the alignment plate 33, a biasing or urging means 27, in the embodiment in the form of a coil spring, is provided. The biasing means 27 are provided on each of the securing bolts 24. The battery cells 26 may advantageously be held in place without adhesive (which can be slow to apply and may inhibit cell replacement) due to friction caused by the biasing means and the nature of the clampingly engaging surfaces of the battery cells 26 and bodies 1a, 1b, 1c. However, adhesive may additionally be used if desired. Ledges or other fixtures (not shown) may be provided for providing additional support if desired. The securing bolts are fixed using nuts 28. The arrangement serves as a support structure for the heat transfer devices and battery packs provided therebetween.

A spacing or offset 30 is provided between the securing plate 25 and the alignment or keep plate 33.

In use, the battery packs or pouches may expand or contract due to thermal expansion and/or chemical composition changes of the battery material. The heat transfer medium cavity volume within each of the heat transfer devices remains substantially constant allowing heat to be conducted away from the battery packs through the surfaces of the heat transfer devices and heat transfer medium passing thought the volume bound the half shells of each heat transfer device. However, due to the sliding interconnection of the spigots and the spacing provided between the securing plate and the keep plate, the heat transfer devices may move relative to one another to accommodate expansion or contraction of the battery packs or pouches. The springs provide a uniform pressure to the heat transfer devices and battery packs positioned therebetween. As such, undue stress on the battery packs is avoided.

The size of the stack may be increased simply by connecting additional heat transfer devices and using longer securing bolts.

The heat transfer fluid may provide a cooling function, a heating function or both, e.g. for temperature control when one or the other may be required at different times. A heating function may be useful for operation in cold conditions for example.

Instead of providing the inlet and outlet spigot manifolds at opposite ends of the bodies 1a, 1b, 1c, in another embodiment they may be located on or near a common edge or side of the bodies and the channels 8 defined by the ribs 7, 7' may be U-shaped or otherwise configured in order to provide two-way flow of heat transfer medium past each battery cells.

The final heat transfer device or final plate of any stack or arrangement may have blanking plugs (not shown) fitted to the interconnecting means 10c, 10c'. Alternatively, feed pipes or conduits may be connected thereto to distribute coolant to a further heat transfer assembly, battery pack or stack, battery module and/or to a pump or a heat exchanger or a heater or part of an engine cooling system, for example of a vehicle to provide heat or cooling capability for the heat transfer medium.

Various modifications may be made to the embodiments described without departing from the scope of the invention as defined in the accompanying claims.

The invention claimed is:

1. A heat transfer assembly comprising:
   a plurality of heat transfer devices, each heat transfer device comprising a body bounding a cavity of substantially constant volume for receiving a heat transfer fluid or medium, a gap or spacing being provided between opposing heat transfer surfaces of adjacent heat transfer devices,
   at least one interconnection element fluidly connecting each heat transfer device with an adjacent heat transfer device, the interconnection element being configured to maintain a consistent fluid connection and, in use, permit variation in the spacing between opposing surfaces of adjacent heat transfer devices, the at least one interconnection element comprising a spigot defining a first tubular portion and a second tubular portion arranged on opposing sides of a respective heat transfer device, an inner surface of the first tubular portion being sized to substantially match an outer diameter of the second tubular portion, the first and second tubular portions defining a respective inlet and outlet that define a fluid through fluid passage, and in which the at least one interconnection element further comprises a radial flange that includes a further fluid passage from the through passage to the cavity,
   securing elements comprising end plates configured to limit displacement of the plurality of heat transfer devices,
   biasing elements comprising springs located between the end plates and an outermost heat transfer device, the biasing elements configured to provide an even pressure on the heat transfer devices and, in use, maintain the body bounding the cavity of the heat transfer device at the substantially constant volume, and
   a sealing element comprising an o-ring, the sealing element configured to provide a fluid-tight seal located between the at least one interconnection element and the adjacent heat transfer device and, in use, permit the interconnecting element to slidingly move relative to the adjacent heat transfer plate, the movement being restrained by the biasing elements so as to maintain the body bounding the cavity at a substantially constant volume.

2. The heat transfer assembly as claimed in claim 1, wherein the at least one interconnection element between adjacent heat transfer devices provides a common and continuous fluid connection.

3. The heat transfer assembly as claimed in claim 1, wherein the plurality of heat transfer devices are in parallel coextensive alignment.

4. The heat transfer assembly as claimed in claim 1, wherein a spacing between the end plates is fixed.

5. The heat transfer assembly as claimed in claim 1, further comprising alignment elements configured to maintain the heat transfer devices in parallel alignment.

6. The heat transfer assembly as claimed in claim 5, wherein the alignment elements interconnect the securing elements.

7. The heat transfer assembly as claimed in claim 5, wherein the alignment elements comprise one or more securing rods or bolts passing through apertures formed in each of the plurality of heat transfer devices.

8. The heat transfer assembly as claimed in claim 7, wherein the springs are provided on the one or more securing rods or bolts.

9. The heat transfer assembly as claimed in claim 5, wherein the alignment elements comprise a keep plate located between the biasing elements and the outermost heat transfer device.

10. A battery stack, comprising:
    a heat transfer assembly comprising:
    a plurality of heat transfer devices, each heat transfer device comprising a body bounding a cavity of substantially constant volume for receiving a heat transfer fluid or medium, a gap or spacing being provided between opposing heat transfer surfaces of adjacent heat transfer devices,
    at least one interconnection element fluidly connecting each heat transfer device with an adjacent heat transfer device, the interconnection element being configured to maintain a consistent fluid connection and, in use, permit variation in the spacing between opposing surfaces of adjacent heat transfer devices, the at least one interconnection element comprising a spigot defining a first tubular portion and a second tubular portion arranged on opposing sides of a respective heat transfer device, an inner surface of the first tubular portion being sized to substantially match an outer diameter of the second tubular portion, the first and second tubular portions defining a respective inlet and outlet that define a fluid through fluid passage, and in which the at least one interconnection element further comprises a radial flange that includes a further fluid passage from the through passage to the cavity, securing elements comprising end plates configured to limit displacement of the plurality of heat transfer devices, biasing elements comprising springs located between the end plates and an outermost heat transfer device, the biasing elements configured to provide an even pressure on the heat transfer devices and, in use, maintain the body bounding the cavity of the heat transfer device at the substantially constant volume, and a sealing element comprising an o-ring, the sealing element configured to provide a fluid-tight seal located between the at least one interconnection element and the adjacent heat transfer device and, in use, permit the interconnecting element to slidingly move relative to the adjacent heat transfer plate, the movement being restrained by the biasing elements so as to maintain the body bounding the cavity at a substantially constant volume, wherein a battery cell, pack or pouch is located in the spacing between opposing heat transfer devices.

11. The battery stack as claimed in claim 10, wherein the heat transfer assembly further comprises alignment elements configured to maintain the heat transfer devices in parallel alignment.

12. The battery stack as claimed in claim 11, wherein the alignment elements comprise a keep plate located between the biasing elements and the outermost heat transfer device.

* * * * *